(12) United States Patent
Longenette

(10) Patent No.: US 8,191,966 B1
(45) Date of Patent: Jun. 5, 2012

(54) GOLF CART SEAT AND BACK COVER SYSTEM

(76) Inventor: Mary L. Longenette, Largo, FL (US)

( * ) Notice: Subject to any disclaimer, the term of this patent is extended or adjusted under 35 U.S.C. 154(b) by 241 days.

(21) Appl. No.: 12/660,638

(22) Filed: Mar. 2, 2010

Related U.S. Application Data

(60) Provisional application No. 61/209,397, filed on Mar. 6, 2009.

(51) Int. Cl.
*A47C 31/00* (2006.01)

(52) U.S. Cl. .............. 297/228.1; 297/228.13; 297/218.1

(58) Field of Classification Search .................. 297/232, 297/228.1, 218.1, 219.1, 228.13
See application file for complete search history.

(56) References Cited

U.S. PATENT DOCUMENTS

| | | | | |
|---|---|---|---|---|
| 4,047,756 A | * | 9/1977 | Ney | 297/219.1 |
| 5,716,096 A | * | 2/1998 | Pryde et al. | 297/228.11 |
| 5,803,539 A | * | 9/1998 | Dewar et al. | 297/228.12 |
| 6,499,801 B1 | * | 12/2002 | Peterson et al. | 297/228.13 |
| 2007/0205649 A1 | * | 9/2007 | Hanson et al. | 297/452.58 |
| 2009/0160230 A1 | * | 6/2009 | Yasuda | 297/228.13 |
| 2009/0173513 A1 | * | 7/2009 | Petak | 174/66 |

* cited by examiner

*Primary Examiner* — David Dunn
*Assistant Examiner* — Erika Garrett

(57) ABSTRACT

An upper section and a seat peripheral section are positioned adjacent to the top and seat periphery of the seat component. The peripheral section has a lowermost edge positioned adjacent to the bottom and periphery of the seat component. The seat cover has a lower section with short peripheral side edges. The side edges are coupled for a minority of their extents to the lowermost edge of the peripheral section. The lower section also has long peripheral rear and front edges. The front edge is coupled for a majority of their extents to the lowermost edge of the peripheral section. The lower section of the seat cover has a zipper parallel with the front and rear edges. The zipper divides the lower section into two similarly sized and shaped pieces. In this manner the seat cover is allowed to be secured to and removed from the seat component.

2 Claims, 3 Drawing Sheets

GOLF CART SEAT AND BACK COVER SYSTEM

RELATED APPLICATION

This application is based upon Provisional Patent Application Ser. No. 61/209,397 filed Mar. 6, 2009, the subject matter of which is incorporated herein by reference.

BACKGROUND OF THE INVENTION

Field of the Invention

The present invention relates to a golf cart seat and back cover system and more particularly pertains to selectively covering portions of a golf cart with a removable seat and back cover, the covering being done in a convenient, eye-appealing and economical manner.

SUMMARY OF THE INVENTION

In view of the foregoing disadvantages inherent in the known types of cover systems of known designs and configurations now present in the prior art, the present invention provides an improved golf cart seat and back cover system. As such, the general purpose of the present invention, which will be described subsequently in greater detail, is to provide a new and improved golf cart seat and back cover system and method which has all the advantages of the prior art and none of the disadvantages.

To attain this, the present invention essentially comprises a golf cart seat and back cover system. First provided is a golf cart. The golf cart has a seat component. The seat component has a generally horizontal resilient top. The seat component has a generally horizontal rigid bottom. The seat component also has a resilient seat periphery. The resilient seat periphery is provided between the top and the bottom. The golf cart also has a back component. The back component has a generally vertical resilient front. The back component has a generally vertical rigid rear. The back component also has a resilient back periphery. The resilient back periphery is provided between the front and the rear. The rigid rear has short side edges. The rigid rear has a long front edge. The rigid rear also has a long rear edge.

Rigid handles are provided. The handles have lower ends. The lower ends are attached to the rigid bottom adjacent to the short side edges. The handles have upper ends. The upper ends are provided adjacent to the seat periphery.

Rigid hinges are provided. The hinges have inner ends. The inner ends are attached to the long front edge. The hinges have outer ends. The outer ends face forewardly of the bottom.

Further provided is a seat cover. The seat cover is removably coupled to the seat component. The seat cover has a generally horizontal upper section. The seat cover has a seat peripheral section. The seat peripheral section is positioned adjacent to the top and seat periphery of the seat component. The upper and peripheral sections are fabricated of a generally inextensible, liquid impervious, flexible, plastic material. The peripheral section has a lowermost edge. The lowermost edge is positioned adjacent to the bottom and seat periphery of the seat component. The seat cover also has a lower section. The lower section has short peripheral side edges. The short peripheral side edges are coupled for a minority of their extents to the lowermost edge of the peripheral section at spaced locations. The lowermost section has a central cutout. In this manner a passage is provided for the handles. The lower section also has a long peripheral rear edge. The lower section has a long peripheral front edge. The peripheral front edge is coupled to the lowermost edge of the peripheral section for a majority of their extents. The lowermost edge has short spaced cutouts. In this manner a passage is provided for the hinges. The lower section of the seat cover is fabricated of an inextensible polymer. The inextensible polymer is provided in an open weave. The lower section has a zipper. The zipper is provided parallel with the front and rear edges of the seat component. The zipper divides the lower section into two similarly sized and shaped pieces. In this manner the seat cover is allowed to be secured to and removed from the seat component.

Provided last is a back cover. The back cover is removably coupled to the back component. The back cover has a generally vertical front section. The back cover has a back peripheral section. The back peripheral section is positioned adjacent to the front and back periphery of the back component. The front and back peripheral sections are formed of a generally inextensible, liquid impervious, flexible, plastic material. The back peripheral section has an innermost edge. The innermost edge is formed with a hem. The hem is positioned adjacent to the rear and back periphery of the back component. Within the hem, an elastic cord is provided. The back cover also has a strap. The strap has ends. The ends are attached to the innermost edge parallel with and equally spaced from the side edges of the rear of the back component. The strap has an adjustable buckle. In this manner the back cover is allowed to be secured to and removed from the back component.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved golf cart seat and back cover system which has all of the advantages of the prior art cover systems of known designs and configurations and none of the disadvantages.

It is another object of the present invention to provide a new and improved golf cart seat and back cover system which may be easily and efficiently manufactured and marketed.

It is further object of the present invention to provide a new and improved golf cart seat and back cover system which is of durable and reliable constructions.

An even further object of the present invention is to provide a new and improved golf cart seat and back cover system which is susceptible of a low cost of manufacture with regard to both materials and labor, and which accordingly is then susceptible of low prices of sale to the consuming public, thereby making such golf cart seat and back cover system economically available to the buying public.

Even still another object of the present invention is to provide a golf cart seat and back cover system for selectively covering portions of a golf cart with a removable seat and back cover, the covering being done in a convenient, eye-appealing and economical manner.

Lastly, it is an object of the present invention to provide a new and improved golf cart seat cover system. An upper section and a seat peripheral section are positioned adjacent to the top and seat periphery of the seat component. The peripheral section has a lowermost edge positioned adjacent to the bottom and periphery of the seat component. The seat cover has a lower section with short peripheral side edges. The side edges are coupled for a minority of their extents to the lowermost edge of the peripheral section. The lower section also has long peripheral rear and front edges. The front edge is coupled for a majority of their extents to the lowermost edge of the peripheral section. The lower section of the seat cover has a zipper parallel with the front and rear edges. The zipper divides the lower section into two similarly sized and shaped pieces. In this manner the seat cover is allowed to be secured to and removed from the seat component.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
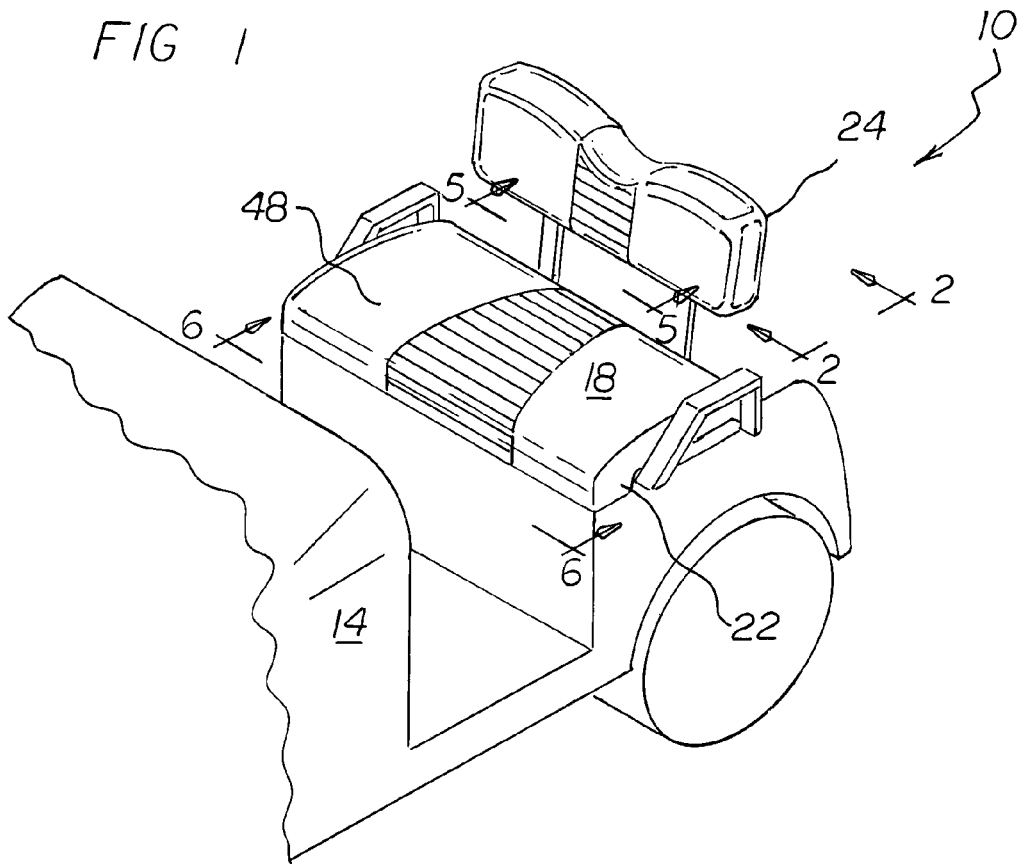
FIG. 1 is a perspective illustration of a golf cart seat cover system constructed in accordance with the principles of the present invention.
Figure 2:
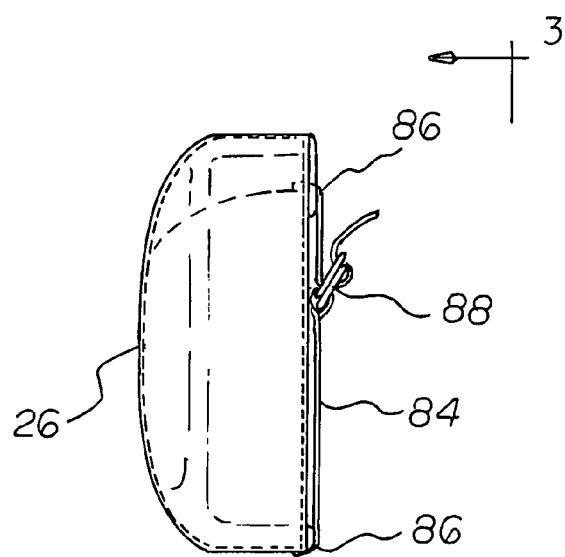
FIG. 2 is a side elevational view taken along line 2-2 of FIG. 1.
Figure 3:
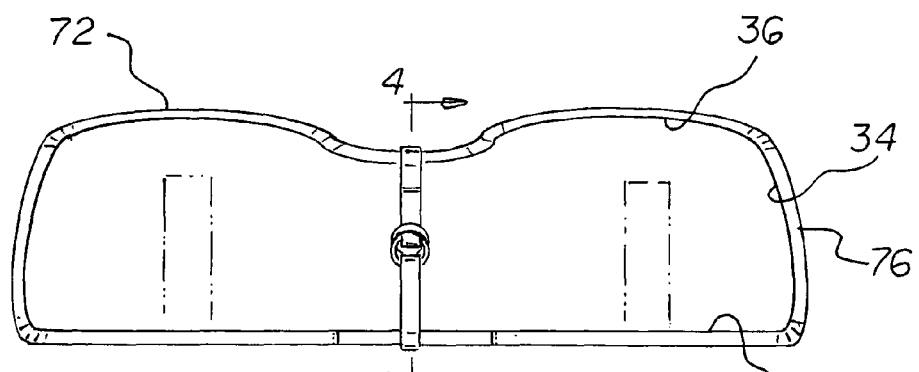
FIG. 3 is a rear elevational view taken along line 3-3 of FIG. 2.
Figure 4:
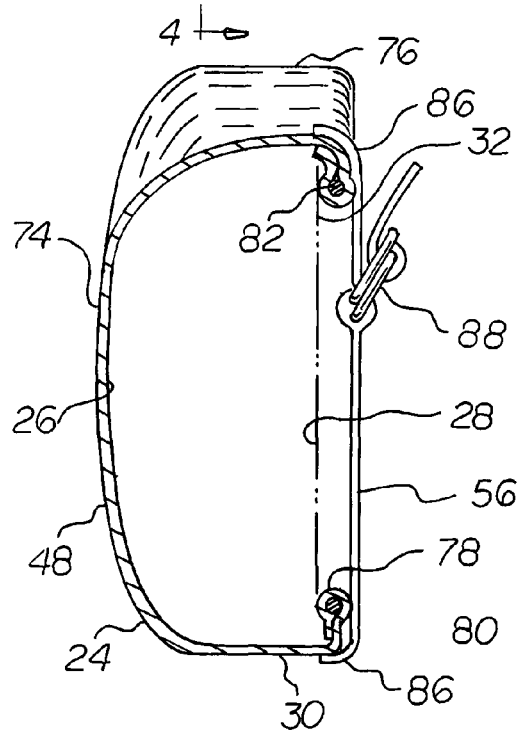
FIG. 4 is a cross sectional view taken along line 4-4 of FIG. 3.
Figure 5:
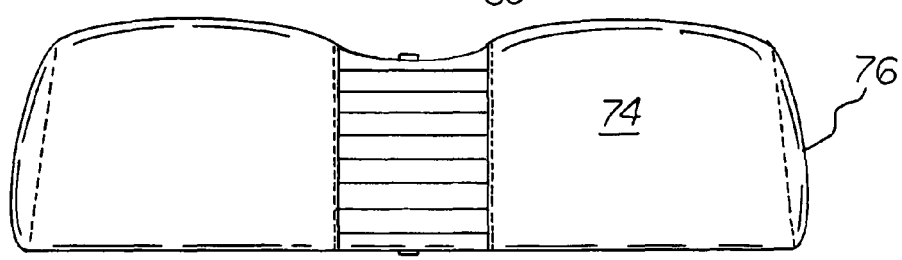
FIG. 5 is a front elevational view taken along line 5-5 of FIG. 4.
Figure 6:
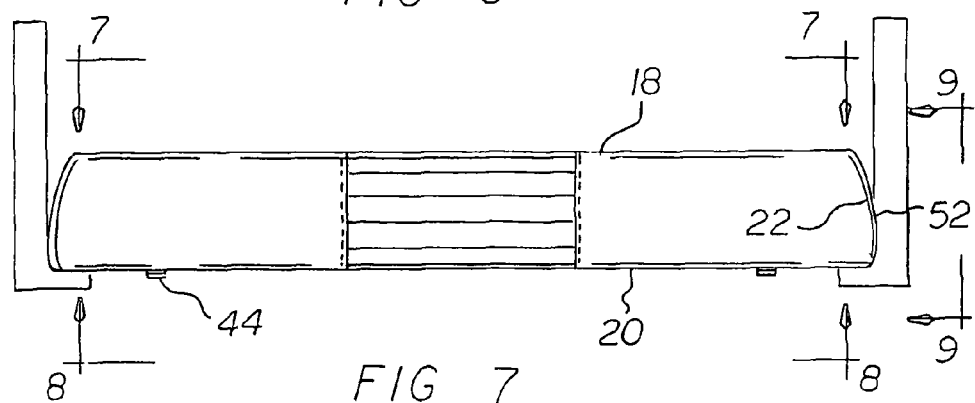
FIG. 6 is a front elevational view taken along line 6-6 of FIG. 1.
Figure 7:
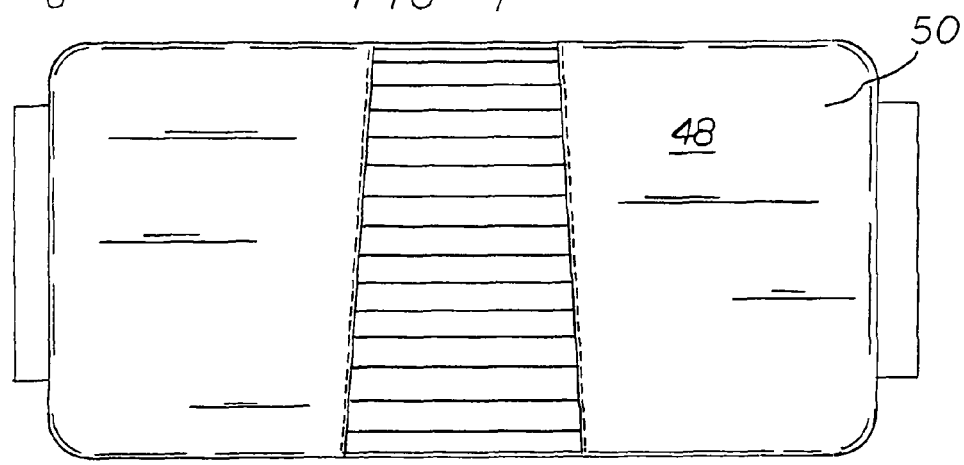
FIG. 7 is a plan view taken along line 7-7 of FIG. 6.
Figure 8:
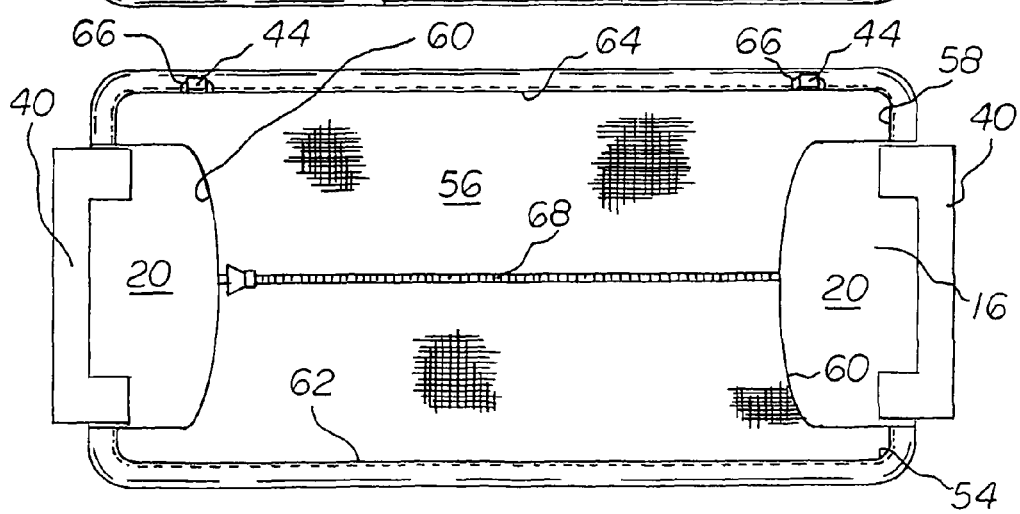
FIG. 8 is a bottom view taken along line 8-8 of FIG. 6.
Figure 9:
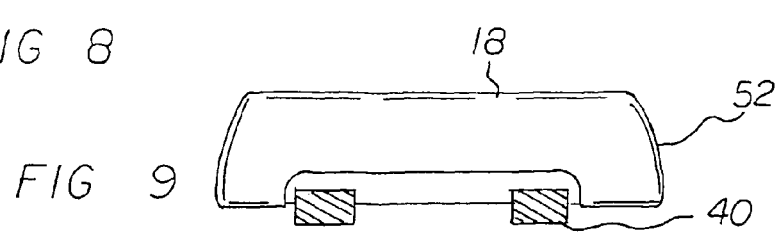
FIG. 9 is an end elevational view taken along line 9-9 of FIG. 6.

With reference now to the drawings, and in particular to FIG. 1 thereof, the preferred embodiment of the new and improved golf cart seat and back cover system embodying the principles and concepts of the present invention and generally designated by the reference numeral 10 will be described.

The present invention, the golf cart seat and back cover system 10 is comprised of a plurality of components. Such components in their broadest context include an upper section and a seat peripheral section. Such components are individually configured and correlated with respect to each other so as to attain the desired objective.

First provided is a golf cart 14. The golf cart has a seat component 16. The seat component has a generally horizontal resilient top 18. The seat component has a generally horizontal rigid bottom 20. The seat component also has a resilient seat periphery 22. The resilient seat periphery is provided between the top and the bottom. The golf cart also has a back component 24. The back component has a generally vertical resilient front 26. The back component has a generally vertical rigid rear 28. The back component also has a resilient back periphery 30. The resilient back periphery is provided between the front and the rear. The rigid rear has short side edges 32. The rigid rear has a long front edge 34. The rigid rear also has a long rear edge 36.

Rigid handles 40 are provided. The handles have lower ends. The lower ends are attached to the rigid bottom adjacent to the short side edges. The handles have upper ends. The upper ends are provided adjacent to the seat periphery.

Rigid hinges 44 are provided. The hinges have inner ends. The inner ends are attached to the long front edge. The hinges have outer ends. The outer ends face forewardly of the bottom.

Further provided is a seat cover 48. The seat cover is removably coupled to the seat component. The seat cover has a generally horizontal upper section 50. The seat cover has a seat peripheral section 52. The seat peripheral section is positioned adjacent to the top and seat periphery of the seat component. The upper and peripheral sections are fabricated of a generally inextensible, liquid impervious, flexible, plastic material. The peripheral section has a lowermost edge 54. The lowermost edge is positioned adjacent to the bottom and seat periphery of the seat component. The seat cover also has a lower section 56. The lower section has short peripheral side edges 58. The short peripheral side edges are coupled for a minority of their extents to the lowermost edge of the peripheral section at spaced locations. The lowermost section has a central cutout 60. In this manner a passage is provided for the handles. The lower section also has a long peripheral rear edge 62. The lower section has a long peripheral front edge 64. The peripheral front edge is coupled to the lowermost edge of the peripheral section for a majority of their extents. The lowermost edge has short spaced cutouts 66. In this manner a passage is provided for the hinges. The lower section of the seat cover is fabricated of an inextensible polymer. The inextensible polymer is provided in an open weave. The lower section has a zipper 68. The zipper is provided parallel with the front and rear edges of the seat component. The zipper divides the lower section into two similarly sized and shaped pieces. In this manner the seat cover is allowed to be secured to and removed from the seat component.

Provided last is a back cover 72. The back cover is removably coupled to the back component. The back cover has a generally vertical front section 74. The back cover has a back peripheral section 76. The back peripheral section is positioned adjacent to the front and back periphery of the back component. The front and back peripheral sections are formed of a generally inextensible, liquid impervious, flexible, plastic material. The back peripheral section has an innermost edge 78. The innermost edge is formed with a hem 80. The hem is positioned adjacent to the rear and back periphery of the back component. Within the hem, an elastic cord 82 is provided. The back cover also has a strap 84. The strap has ends 86. The ends are attached to the innermost edge parallel with and equally spaced from the side edges of the rear of the back component. The strap has an adjustable buckle 88. In this manner the back cover is allowed to be secured to and removed from the back component.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A seat cover for a golf cart of the type having a seat component with a top and a bottom and a seat periphery, the seat cover including:
    an upper section and a seat peripheral section positioned adjacent to the to and seat periphery of the seat component, the seat peripheral section having a lowermost edge positioned adjacent to the bottom and seat periphery of the seat component, the seat cover having a lower section with short peripheral side edges coupled for a minority of their extents to the lowermost edge of the peripheral section, the lower section also having a long peripheral rear edge and a long peripheral front edge coupled for a majority of their extents to the lowermost edge of the peripheral section, the lower section of the seat cover having a zipper parallel with the front and rear edges and dividing the lower section into two similarly sized and shaped Pieces for allowing the seat cover to be secured to and removed from the seat component; and
    a back cover for a golf cart of the type having a back component with a front and a rear and a back periphery, the back cover removably coupled to the back component, the back cover having a front section and a back peripheral section positioned adjacent to the front and back periphery of the back component, the peripheral section having an innermost edge formed with a hem positioned adjacent to the rear and back periphery of the back component, an elastic cord within the hem, the back cover also having a strap with ends attached to the innermost edge parallel with and equally spaced from the side edges of the rear of the back component, the strap having an adjustable buckle for allowing the back cover to be secured to and removed from the back component.

2. A golf cart seat and back cover system for selectively covering portions of a golf cart with a removable seat and back cover, the system comprising, in combination:
    a golf cart having a seat component, the seat component having a generally horizontal resilient top and a generally horizontal rigid bottom and a resilient seat periphery between the top and the bottom, the golf cart also having a back component, the back component having a generally vertical resilient front and a generally vertical rigid rear and a resilient back periphery between the front and the rear, the rigid rear having short side edges and a long front edge and long rear edge;
    rigid handles having lower ends attached to the rigid bottom adjacent to the short side edges, the handles having upper ends adjacent to the seat periphery;
    rigid hinges having inner ends attached to the long front edge, the hinges having outer ends facing forewardly of the bottom;
    a seat cover removably coupled to the seat component, the seat cover having a generally horizontal upper section and a seat peripheral section positioned adjacent to the top and seat periphery of the seat component, the upper and peripheral sections being fabricated of a generally inextensible, liquid impervious, flexible, plastic material, the peripheral section having a lowermost edge positioned adjacent to the bottom and seat periphery of the seat component, the seat cover also having a lower section with short peripheral side edges coupled for a minority of their extents to the lowermost edge of the peripheral section at spaced locations, the lowermost section having a central cutout for the passage of the handles, the lower section also having a long peripheral rear edge and a long peripheral front edge coupled to the lowermost edge of the peripheral section for a majority of their extents, the lowermost edge having short spaced cutouts for the passage of the hinges, the lower section of the seat cover being fabricated of an inextensible polymer in an open weave and having a zipper parallel with the front and rear edges of the seat component and dividing the lower section into two similarly sized and shaped pieces for allowing the seat cover to be secured to and removed from the seat component; and
    a back cover removably coupled to the back component, the back cover having a generally vertical front section and a back peripheral section positioned adjacent to the front and back periphery of the back component, the front and back peripheral sections being formed of a generally inextensible, liquid impervious, flexible, plastic material, the back peripheral section having an innermost edge formed with a hem positioned adjacent to the rear and back periphery of the back component, an elastic cord within the hem, the back cover also having, a strap with ends attached to the innermost edge parallel with and equally spaced from the side edges of the rear of the back component, the strap having an adjustable buckle for allowing the back cover to be secured to and removed from the back component.

* * * * *